Nov. 12, 1963     F. W. SUNDBLAD     3,110,108
SOLAR INSTRUMENT
Filed July 17, 1961     6 Sheets-Sheet 1
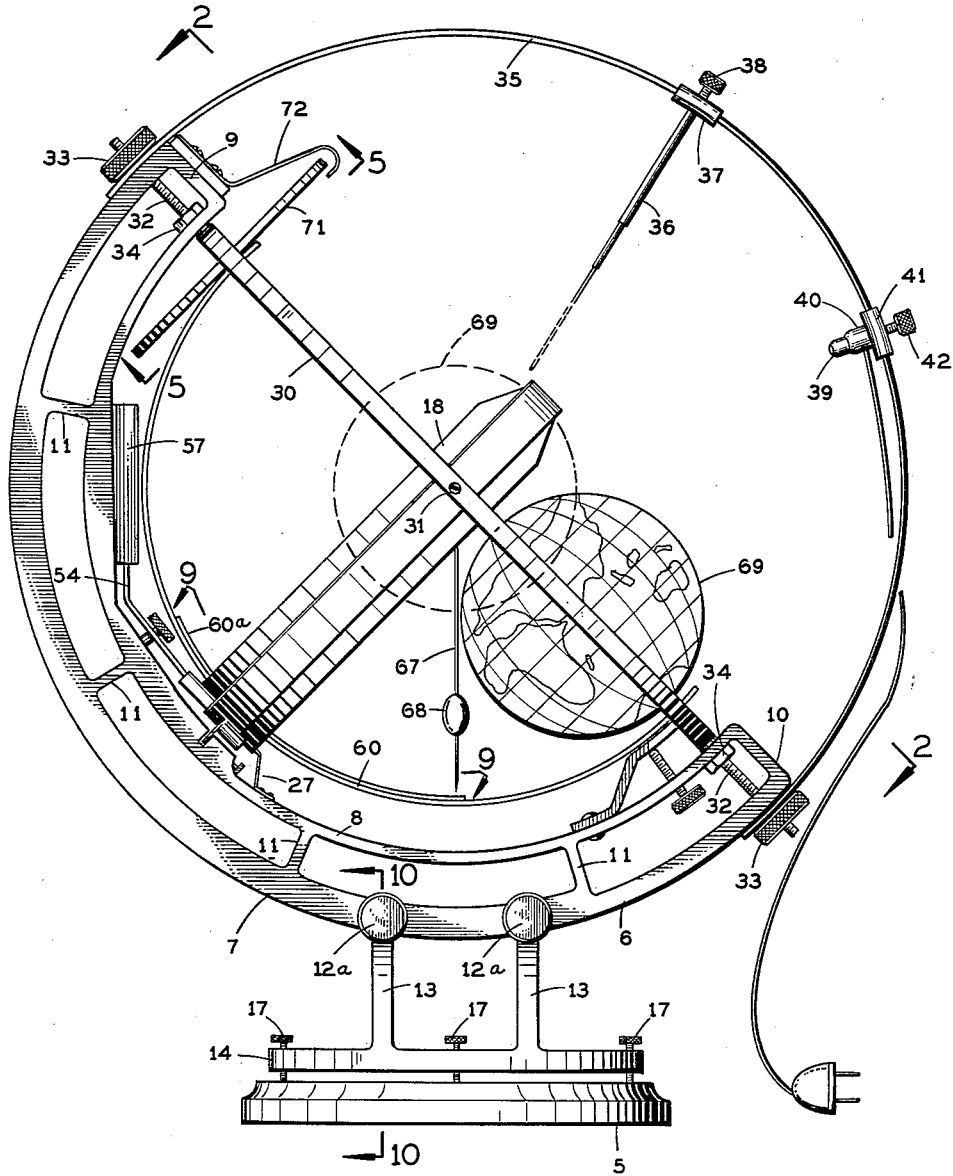
FIG. 1
INVENTOR.
FOLKE W. SUNDBLAD
BY
ATTORNEY Nov. 12, 1963 F. W. SUNDBLAD 3,110,108
SOLAR INSTRUMENT
Filed July 17, 1961 6 Sheets-Sheet 2

INVENTOR.
FOLKE W. SUNDBLAD
BY
ATTORNEY

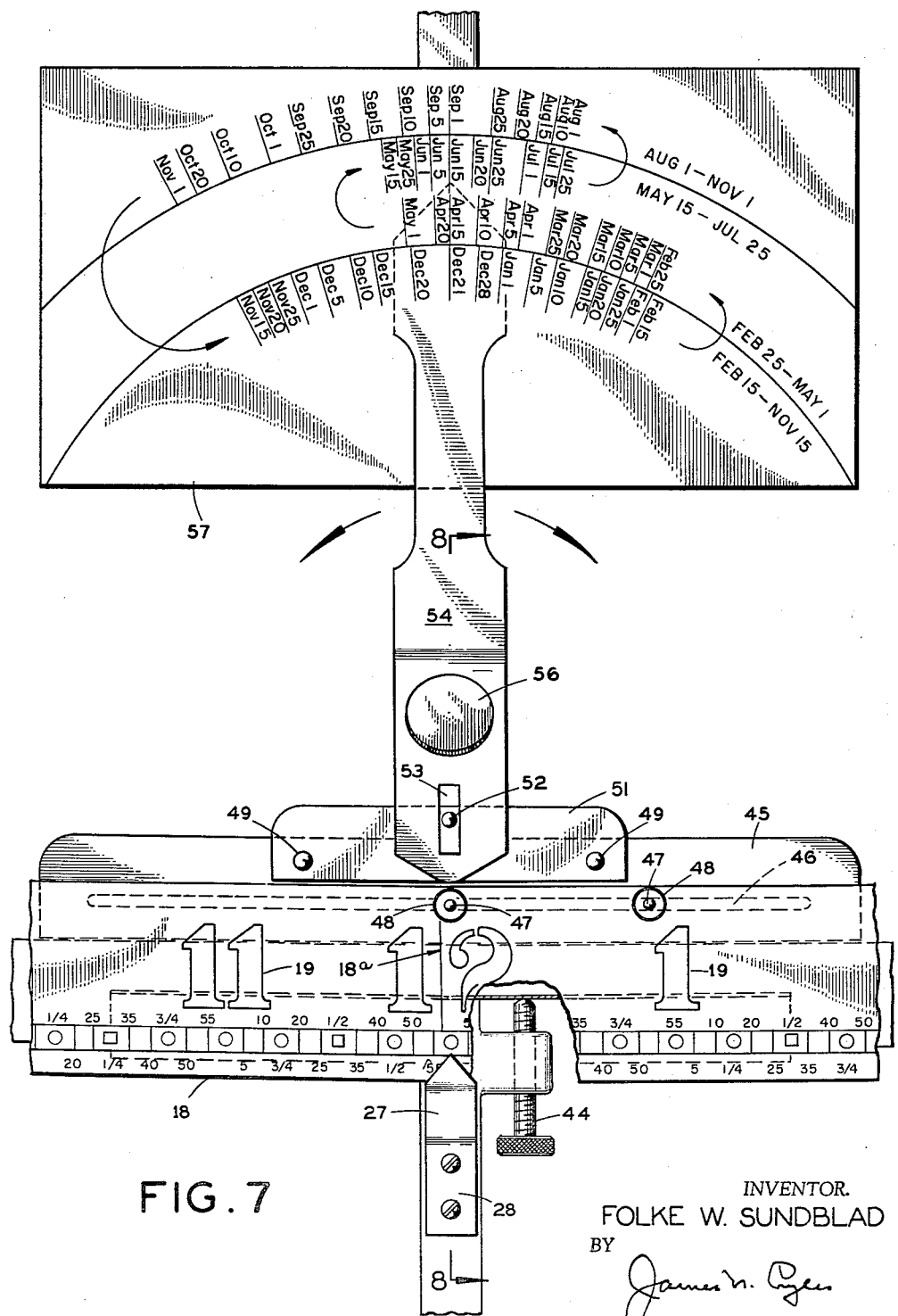

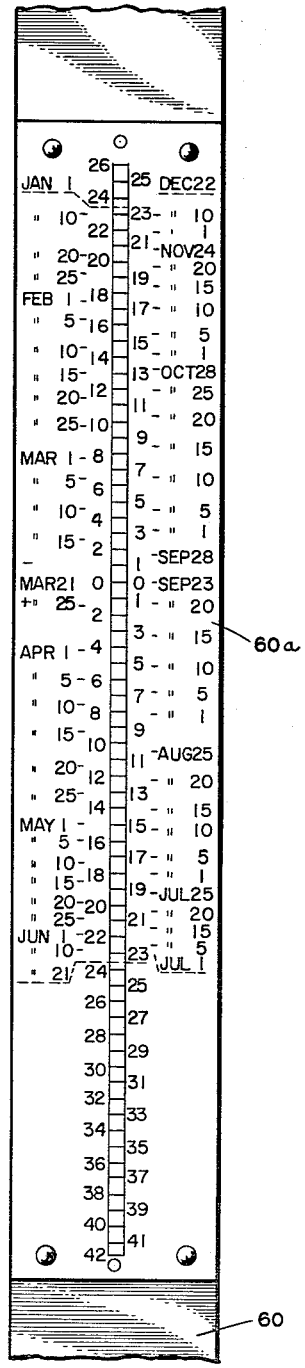
FIG. 9
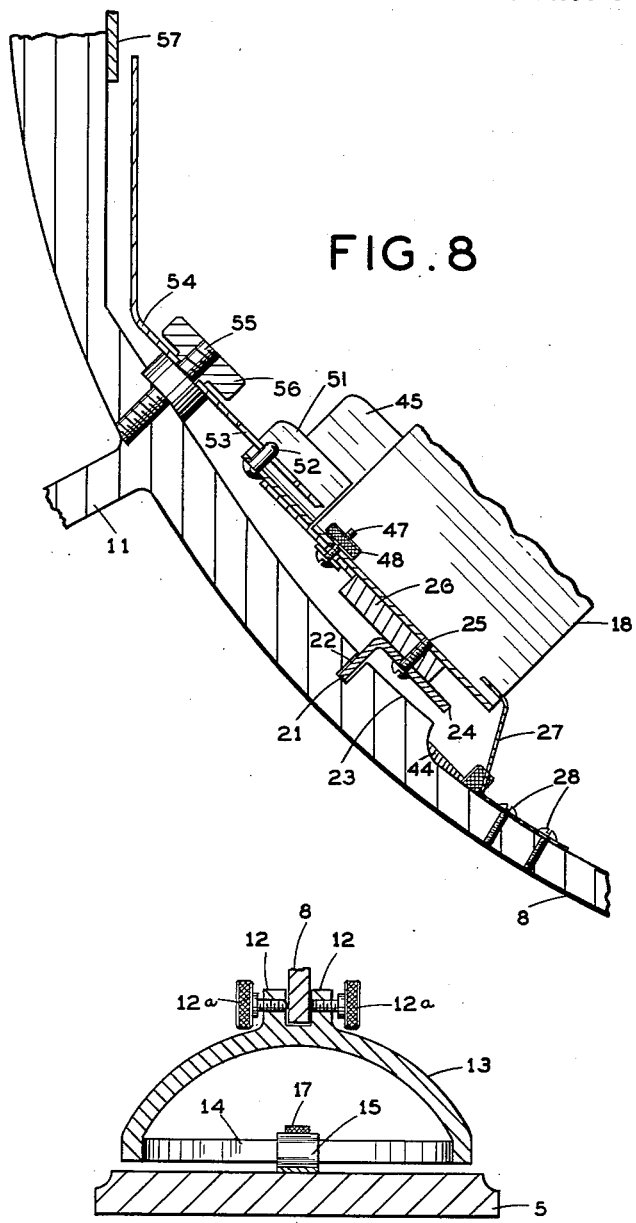
FIG. 8
FIG. 10
INVENTOR.
FOLKE W. SUNDBLAD

United States Patent Office 3,110,108
Patented Nov. 12, 1963

3,110,108
SOLAR INSTRUMENT
Folke W. Sundblad, Fort Lauderdale, Fla., assignor to Modern Sundials Inc., Fort Lauderdale, Fla., a corporation of Florida
Filed July 17, 1961, Ser. No. 125,051
8 Claims. (Cl. 33—62)

This invention relates to solar instruments such as those of the type shown and described in my Patent No. 2,754,593, dated July 27, 1956, and the invention has for one of its objects the provision of an instrument capable of converting sun time into standard or daylight saving time by the application of a principle pertaining to the so-called "time equation" and "declination" problems.

The invention involves an arrangement by which the movement of an hour band is determined and controlled by a pointer which in turn is moved and set according to the current date.

It is an object of the invention to provide a device by which dates and months of the year are registered with the aid of a moving shadow of a cross wire in the center of the instrument and positioned at right angles to the gnomon rod upon a declination band situated at right angles to the hour band. The declination band is calibrated to show dates and months as well as degrees. By placing a dependent, weighted indicator on the cross wire the exact angle of the gnomon rod in relation to the horizontal line of the selected locality can be determined and because such angle represents the latitude of a particular location, the latitude of such location will be thus ascertained.

It is an object of the invention to provide means by which the apparent movements of the sun can be duplicated by the use of artificial light so that the astronomic aspects of the sun to the earth relationship can be taught by applying these movements to a globe disposed within the frame of the instrument and capable of rotating around its axis, which corresponds to the gnomon or wire that is producing a shadow on the hour band.

The instrument has various other uses and advantages as will be set forth hereafter and which will be apparent to those skilled in this art.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is an elevational view of a solar instrument constructed according to the invention;

FIG. 7 is a top plan view of a portion of the time or hour band and associated parts, together with the pointer or indicating hand coupled thereto, and showing the time chart to which the indicating hand or pointer refers;

FIG. 8 is a sectional view, taken substantially on the line 8—8 of FIG. 7, looking in the direction of the arrows;

FIG. 9 is a face view of the latitude chart borne by the declinator band, the view being taken as indicated by the arrows at 9—9 in FIG. 1, and FIG. 10 is a sectional view, taken substantially on the line 10—10, looking in the direction of the arrows.

Figure 2:
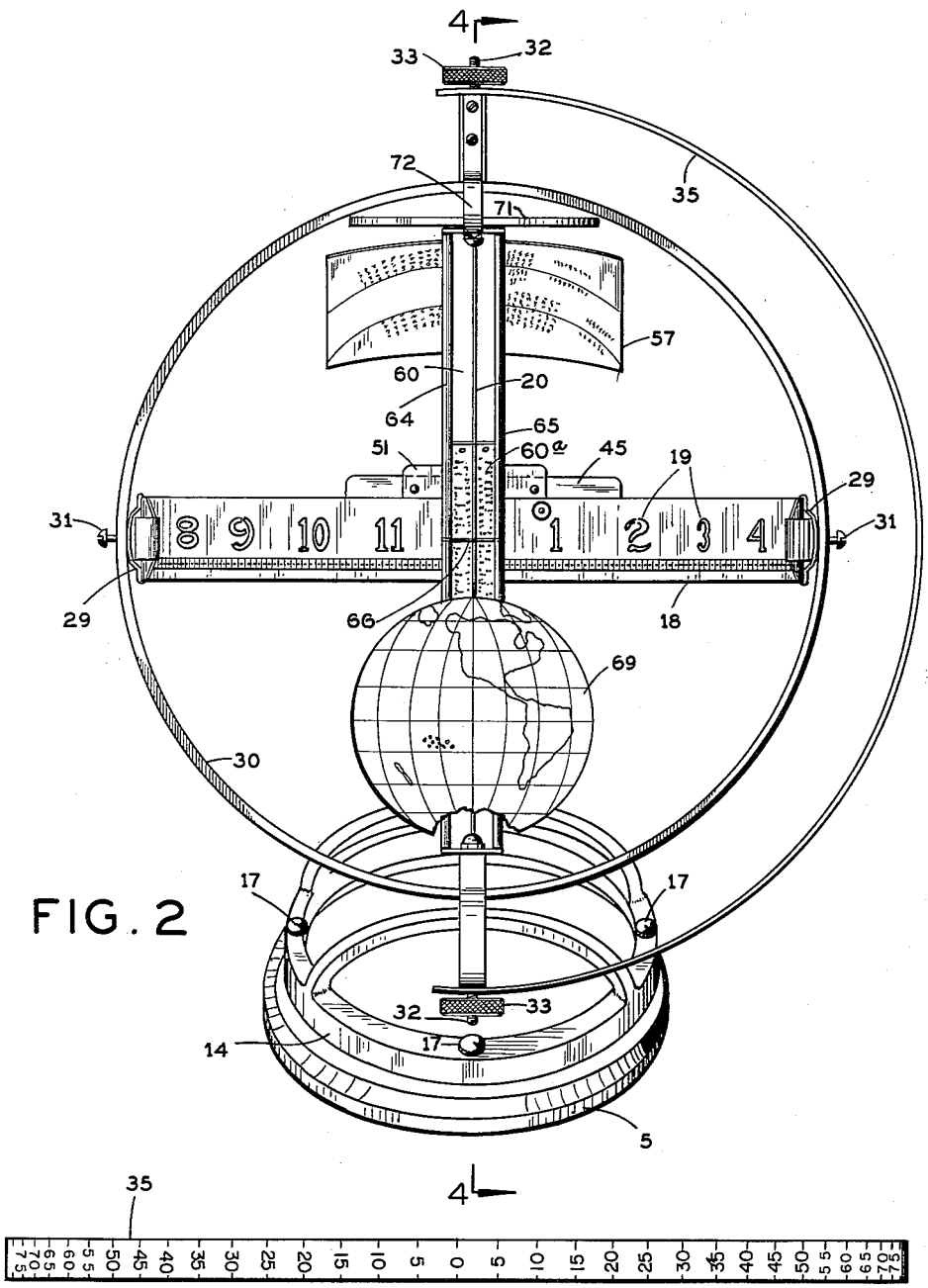
FIG. 2 is a sectional view, taken substantially on the line 2—2 of FIG. 1, looking in the direction of the arrows.

Referring to the drawings, 5 designates a rigid and firm supporting base for the instrument, the same, as shown, being substantially circular or disc shape. The base 5 may be formed of any suitable material and should be of a size and weight as to hold the instrument and avoid any possibility of it toppling over when in use.

The main frame of the instrument is generally indicated at 6, the same consisting of an outer arcuately-shaped bar 7 and an inner similarly-shaped bar 8 extending parallel to the outer bar and spaced therefrom, the two bars 7 and 8 being connected at their ends by the struts 9 and 10 and joined at spaced points between their ends by the struts 11. The frame 6, constructed as above described, may be in the form of an aluminum casting, the parts therof being integrally formed.

Figure 4:
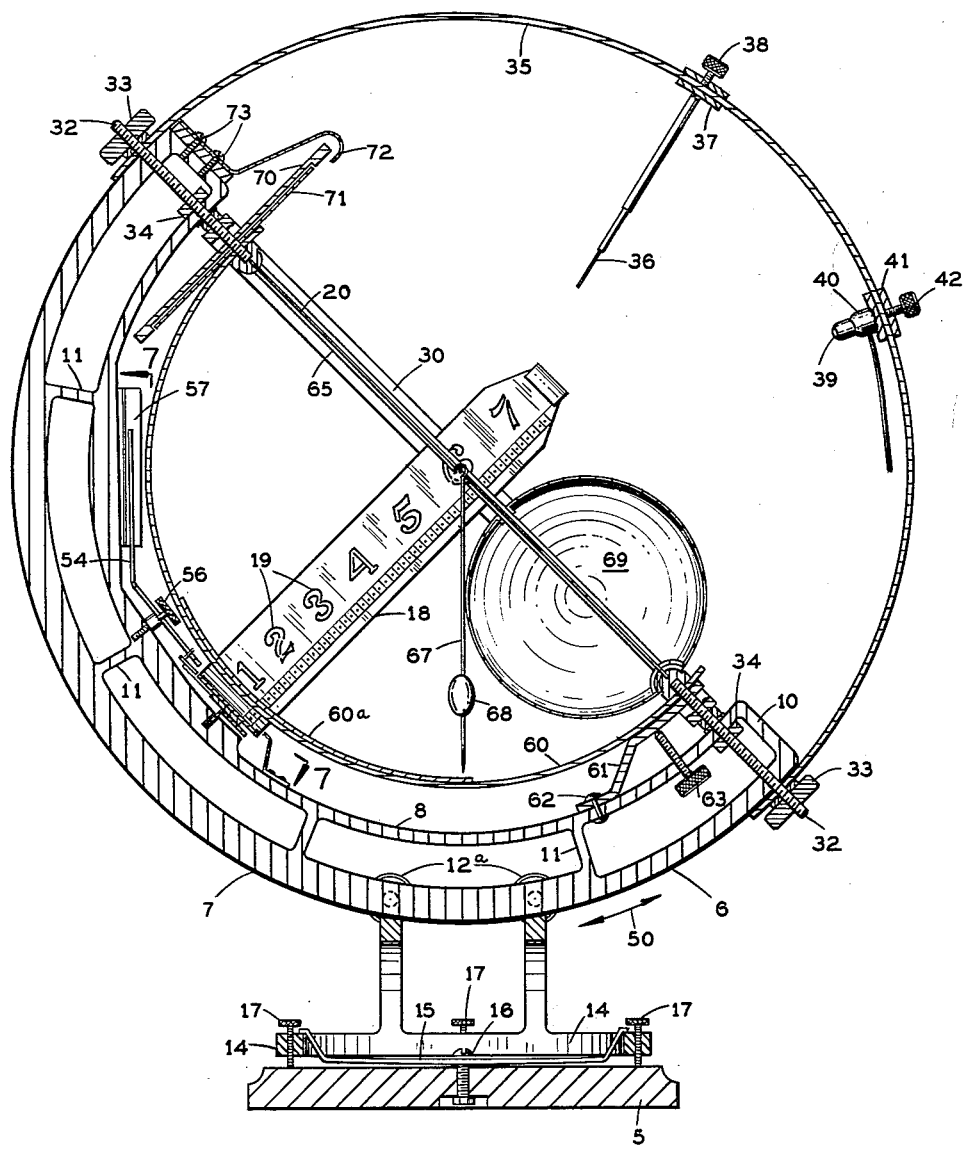
FIG. 4 is a sectional view, taken substantially on the line 4—4 of FIG. 2, looking in the direction of the arrows.

The frame 6 is mounted for lengthwise sliding adjustment in two directions as indicated by the arrows 50 in FIG. 4, between lugs 12 (FIG. 10) provided on upwardly-curved cross members 13 having their lower ends integrally joined to a ring 14, held on the top of the base 5 by a cross strap 15 (FIG. 4) secured at its center by means of a bolt 16 or other equivalent fastening element extending through the strap and through the base. The ring 14, and hence the frame 6, may be levelled by means of adjustment screws 17 threadably adjustable through the ring 14 and operative against the upper surface of the base 5. Set screws 12a extending through the lugs 13 to bear against the sides of the bar 7, serve to maintain the frame 6 in any selected position of adjustment.

Mounted for transverse adjustment relatively to the frame 6 is the hour or time band generally indicated at 18, the same consisting of an arcuate or semi-circular strip bearing calibrations 19 on its upper or concave face, such calibrations indicating the hours of daylight, the scale of these calibrations being provided with a transverse meridian line 18a bisecting the numeral (12). The hour or time band 18 is divided into the hours of daylight with the numerals (1) to (8) disposed to the right of the numeral (12) at one hour spacing and with the numerals (11) to (8) being disposed to the left of the numeral (12) at one hour spacing. The several numerals may be printed, etched or otherwise impressed on the hour or time band in a relatively large size and the individual hourly spacing may be subdivided into half hours and minutes for a more accurate determination of the time as indicated by the shadow of a gnomon rod 20 passing across the band 18.

The hour or time band 18 is mounted for adjustment in a direction transversely of the frame 6 by means of an angle piece 21 (FIG. 8) slidable in a slot 22 formed in a thickened portion 23 of the inner bar 8 of the frame 6. Said angle piece 21 has a flange 24 secured by screws 25 to the time band 18. A set screw 44 is operative against the angle-piece 21 to hold the band 18 in any selected position of adjustment. A fixed pointer 27 is attached by screws 28 to the bar 8 of the frame, said pointer being effective to indicate time designations on the scale 19 when one or the other of such designations is aligned with the tip or pointed extremity of the pointer.

The hour or time band 18 is supported and guided in its sliding movement by guides 29 which embrace the band 18 and couple it slidably to a ring 30 by means of the screws 31 (FIG. 2). The ring 30 is secured to the frame 6 by diametrically-opposite threaded rods 32, each of which receives a nut 34 and also receives a knurled nut 33. An arcuate strip or band 35 has its opposite ends respectively pivoted on the rods 32, the knurled nuts 33 serving to fixedly position the strip 35 in any desired angular relationship to the frame 6.

Figure 3:
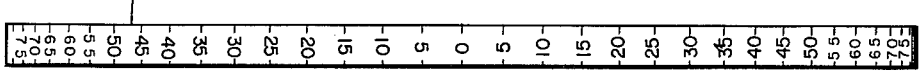
FIG. 3 is a face view of the arcuate outer band of the device showing the degree calibrations appearing thereon.

Slidably mounted on the strip 35 is an adjustable pointer or finger 36, which is longitudinally extensible, the purpose of which will be hereinafter described, said pointer having a sleeve 37 at one end extending around the strip 35 and being slidable thereon. A set screw 38 passing through the sleeve engages against the outer face of the strip 35 to locate the pointer or finger in any desired position of adjustment. A lamp 39 is mounted in a suitable socket 40, the socket being carried by a sleeve 41 slidably adjustable along the length of the strip 35 and maintained in any desired position of adjustment thereon by means of a set screw 42. The outer or convex side of the strip 35 is calibrated as indicated at 43 (FIG. 3) to indicate various degrees at which either the pointer 36 or the lamp 39 may be positioned.

Mounted for adjustment relatively to the time or hour band 18 is a curved plate 45, said plate being curved complementarily to the band 18. The plate 45 has a portion projecting beneath the band 18, said portion being provided with a longitudinal slot 46 (FIG. 7). Screws or bolts 47 extend through the band 18 and through the slot 46, thus coupling the band 18 and the plate 45 together, but permitting relative sliding adjustment of said band and plate. Nuts 48, threadable on the screws 47 secure the plate and band together in any required position.

Mounted on the plate 45 and fixedly attached thereto by the rivets 49 or by other equivalent fastening means, is a plate 51 provided with an upwardly-projecting pin 52 received in a longitudinally-extending slot 53 provided in an indicating hand or pointer 54, thus providing for an articulative connection between the indicator 54 and the plate 45. Said hand or pointer, constituting an indicator, is shown in detail in FIGS. 7 and 8, and is pivoted on a threaded stud 55 secured in the bar 8 of the frame 6. The indicating hand or pointer 54 is held against undesired pivotal movement by a knurled nut 56 received on the stud 55 and which, when loosened, permits pivotal movement of the indicating hand. The indicating hand or pointer 54 has an angularly-bent end operative across the face of a calibrated-bent end operative across the face of a calibrated time chart 57, the calibrations thereon indicating various calendar dates.

Mounted on the pivot rods 32 is a declinator band 60, the same consisting of an arcuate strip, bearing on its upper or concave face, the latitude chart, suitably calibrated as indicated at 60a in FIG. 9. The declinator band 60 is pivotally movable on its axis, consisting of the rods 32 and is frictionally maintained in any required position by a finger 61 secured at one end to the bar 8 by rivets 62, and having its other end area bearing against the band 60, the pressure of the finger being regulated by the set screw 63.

Figure 6:
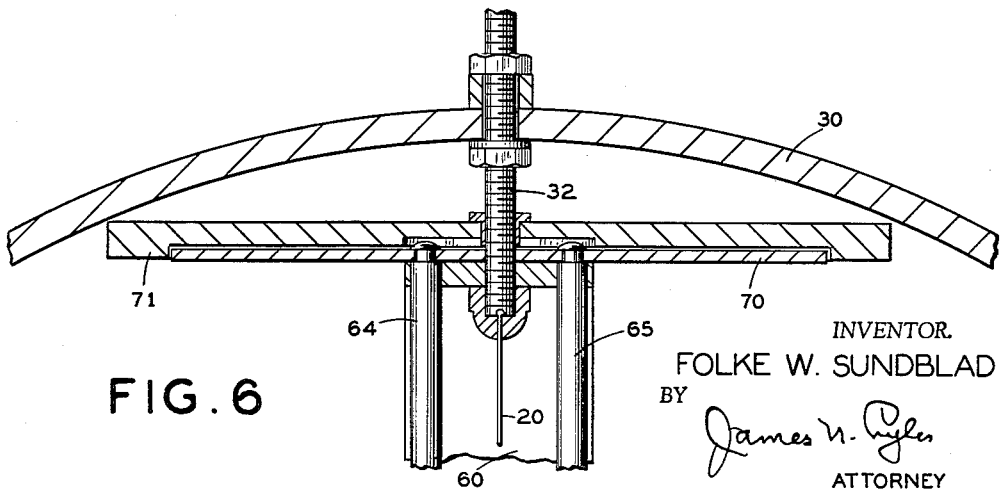
FIG. 6 is a sectional view, taken substantially on the line 6—6 of FIG. 5, looking in the direction of the arrows.

Extending between the ends of the declinator band 60 and fixed relative thereto is a pair of spaced, parallel rods 64, 65 between which the gnomon rod 20 is located (see FIG. 6). Extending between the rods 64 and 65 at a central point in the apparatus or directly above the hour or time band 18, is a cross rod 66 from which is hung a detachable weighted indicator 67, the weight thereon being indicated at 68.

Slidably mounted along the length of the rods 64 and 65 as well as on the gnomon rod 20 is a hollow rotative geographical globe 69 bearing the conventional representations of the various continents and the latitude and longitude markings and the longitude markings co-operate with the markings on the dial discs 70 and 71.

Figure 5:
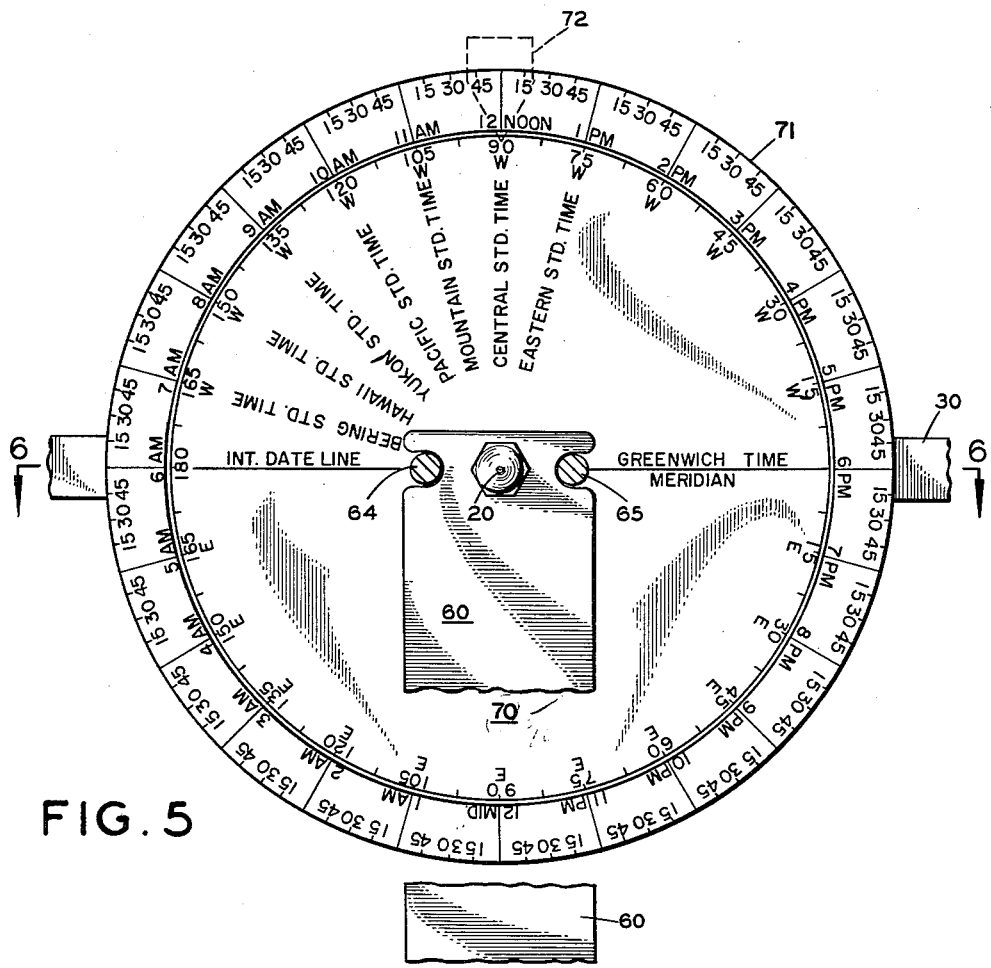
FIG. 5 is a sectional view, taken substantially on the line 5—5 of FIG. 1, looking in the direction of the arrows.

Secured at one end of the declinator band 60 and attached to the rods 64 and 65 is a disk 70 (FIG. 5) charted or calibrated to indicate longitudes and various standard times, said disk being disposed in overlying relation to and arranged for co-operation with an outer disk 71 calibrated into hourly divisions and portions thereof. The outer disk is mounted for manual rotational adjustment, and a pointer or indicating hand 72 (FIG. 4) secured at 73 to one end of the frame 6 extends over it. The smaller disk, or that shown at 70 is rotative or movable with the declinator band 60 when such band is pivotally swung to any desired position.

With this improved solar instrument, the exact apparent movements of the sun are determinable and can be reduced to terms of simplicity, making them readily understandable. These movements can be duplicated with the aid of an artificial light, indicated at 39, so that practical demonstrations can be had in a class room, and the astronomic aspects of the sun and its relationship to the earth developed by applying these movements to the globe 69 provided in the instrument and mounted so as to be capable of rotation around its axis, which is the gnomon rod 20.

A number one point is accomplished by arranging the sun-fast and sun-slow periods of time of the time-equation curves in such a manner that the indicator 54, rotatable around the fixed point 55 and having one end flexibly coupled by the pin 52 in slot 53, will move the hour band 18 for the exact distance in terms of minutes for any given date and month of the year recorded on the chart 57. As a result, the shadow of the gnomon rod 20 will show the exact standard time or daylight saving time, provided the instrument is set for the local longitude and latitude.

To set the instrument for local longitude, the hour or time band 18 is provided with the plate 45 to which the indicator 54 is attached. By loosening the nuts 48 and 44 and at the same time holding the indicator at a point where it designates the center line of the chart 57, the hour band 18 can be released for movement to a position where the distance in terms of minutes will designate local longitude. For example, for a locality situated 5 degrees west of standard time meridian, the hour band 18 will be moved so that the 12:20 mark is indicated by the pointer 27 on band 18, one degree being equal to four minutes. Should the locality be situated 5 degrees east of standard time meridian, the hour band 18 should be so moved that the 11:40 mark thereon is indicated by the pointer 27. When this is done, the nuts 48 are tightened and the indicator 54 released. To anchor the hour band 18 to a certain date on the chart 57, the set screw 44 is used.

To set the instrument for local latitude, the dependent weighted indicator 67 is suspended from the cross rod or wire 66 and the indicator 67 will indicate the true angle between the gnomon and the horizontal line, which angle is also equivalent to the particular latitude for which a reading is sought.

The purpose of the declinator band 60 is to record and demonstrate the movements of the earth around the sun. This half-circular band 60, which has the same center as the hour band 18, but is disposed at right angles to the same, is provided with a scale 60a (FIG. 9) showing dates, months and degrees. The movement of the shadow of the cross rod or wire 66 in the center of this band, will show the exact apparent movements of the sun during the year. Thus, it will show how this shadow travels up and down the scale 60a, from 23½ degrees south of the zero point, which denotes the equator (June 21) to 23½ degrees north of the zero point (December 22). Also when this shadow passes the zero point (the equator) this occurs on either September 23 or March 21, thereby demonstrating the astronomic events called equinoxes. By recording these up and down movements of the shadow on a plotting paper, a profile of the orbit of this planet around the sun will result, which profile lends itself exceptionally well to demonstrate not only the angle between the plane of the orbit and the equator, but also astronomic events such as signs of zodiac and equinoxes.

To duplicate the apparent movements of the sunbeam, the arcuate strip 35 is provided so that the instrument can be set for the latitude in question, that is, by moving the light so that the shadow of the light falls upon the date in question. The strip has the same center as that of the hour or time band 18 and the declinator band 60. As a result, the lamp 39, carried by the strip 35, will produce identical angles with the gnomon 20 on any given date as that of the sunbeam on the same date, provided that the instrument is set for the latitude in question. This possibility creates an entirely new approach to the teaching of sun-earth relationship from an astronomic viewpoint, because when applied to a globe it is possible to automatically duplicate the angles produced by the sun beam relative to the gnomon and the horizontal line at any point on this globe. Having established this angle on the declinator band at noon time for a certain locality on a given date and month with the help of the artificial light beam from lamp 39 and the shadow on the scale of the declinator band 60, the lamp is replaced with the pointer 36. After this is done, the globe 69 is moved back or forth along the rods 64 and 65 or rotated around its axis until the pointer 36 points at the locality to be studied. Thereby the exact angle between the pointer 36 and the horizontal line at any point on this globe can be demonstrated and measured with a small protractor with the result that the geometrical problems involving the relationship between altitude, zenith point, zenith distance and latitude, become easily understood.

To greatly simplify the problems dealing with time and seasonal differentials, time zones and their relationship to longitudes and latitudes etc., this instrument is provided with the circular charts or disks 70 and 71 revolving around the same axis as that of the globe 69. The smaller one of these charts, or that indicated at 70, remains in fixed position relative to the globe, which means that when the globe is rotated the chart 70 will rotate in company with it. This chart 70 demonstrates longitudes and time zones. The larger chart, or that indicated at 71, is capable of an independent rotative movement and it indicates clock time. It can be adjusted to any longitude of the globe and relatively to the chart 70 with the help of the stationary indicator or pointer 72.

If for example, the problem is to determine the time differential between Chicago and Honolulu, and the time of the day is, for example, 11.15 a.m. the operation is as follows: First, the globe 69 is revolved until the pointer 36 points at Chicago. Next, the chart 71 is revolved until the 11.15 a.m. mark is under the indicator 72, whereupon the chart 71 is located at that point. The globe 69 is then revolved from west to east until the pointer 36 is in line with the longitude of Honolulu. The time then indicated under the indicator 72 will then be the time at that city.

To demonstrate, for example, the time for the sunrise or sunset at various parts of the globe, the pointer is replaced with the lamp 39, and the line between shaded and lighted areas will provide the time at the selected locations. To demonstrate the reasons why the northern hemisphere has summer while the southern hemisphere has winter and vice versa becomes axiomatic by merely demonstrating the above-mentioned up and down movement of the light beam from 23½ degrees south to 23½ degrees north of the equator as indicated by the calibrations on the outer face of the strip 35.

Having thus described a single embodiment of the invention, it is obvious that the same is not to be restricted thereto, but is broad enough to cover all structures coming within the scope of the annexed claims.

What I claim is:

1. A solar instrument comprising, a support, an arcuate frame adjustable on said support, an arcuate time or hour band adjustable transversely of the frame, a declinator band disposed within the frame and pivotal transversely of the hour band, supports extending from one side of the frame to its opposite side, a globe slidable along said supports, a gnomon rod located between the supports, a cross rod extending between the supports, a weighted indicator dependent from the cross rod and directed toward the declinator band, a curved strip extending between the ends of the frame, a pointer adjustably carried on the strip and operative to indicate localities on the globe, and a light carried on and adjustable along the length of the strip.

2. A solar instrument comprising, a base, a curved supporting frame adjustable on the base, a curved hour band extending transversely across the frame and adjustable across the same, said band bearing time markings, a declinator band disposed within the hour band and disposed transversely of the same, means for pivotally mounting the declinator band, a pair of spaced supporting rods extending between the declinator band-mounting means, a gnomon rod located between the supporting rods, a pointer articulatively connected to the hour band, a chart indicating dates and months over which the pointer is moved upon shifting movements of the hour band, the declinator band being calibrated with dates and degrees, a hanging pointer suspended from the supporting rods and directed toward the declinator band, a pair of co-operating movable disk charts, one of said charts being calibrated to indicate longitudes and time zones, the second chart being calibrated to indicate clock time, one of the charts being manually adjustable relatively to the other, and the second chart being attached to and being rotated when the supporting rods are rotated, and a globe slidable on the supporting rods and carried by the same.

3. A solar instrument as provided for in claim 2, including a curved strip carried by the frame, an illuminating element on said strip and adjustable along the length of the same, and a pointer carried by the strip and adjustable along its length for indicating localities on the globe.

4. A solar instrument comprising, a frame, a support on which the frame is adjustable, a curved hour band transversely adjustable across the frame, a declinator band located within the hour band and pivotal relatively to the same, a ring extending between the ends of the frame, rods extending across the ring, a gnomon rod disposed between said rods, a cross rod extending between the rods, a hanging indicator suspended from the cross rod, indicating means coupled to the hour band for charting dates and months, a globe slidable on the rods and rotative with the same, a pointer mounted on the frame and movable to indicate localities on the globe, illuminating means, and chart means for indicating longitudes, time zones and clock time according to the positioning of said chart means and according to the rotative movements of the globe.

5. A solar instrument comprising, a support, a frame adjustable on the support, an hour band adjustable transversely of the frame, a declinator band disposed within the frame and located transverse to the hour band, said declinator band being pivotal transversely of the hour band, a supporting ring extending from one side of the frame to its opposite side, rods extending across the ring, a globe mounted on and slidable along the rods, a gnomon rod positioned between said rods, an indicator directed toward the declinator band, an arcuate strip extending between and secured to the ends of the frame, a pointer adjustably carried on the strip and operative to indicate localities on the globe, and a light carried on and adjustable along the length of the strip.

6. A solar instrument comprising, a base, a curved supporting frame arcuately adjustable on said base, a curved hour band extending transversely across the frame and adjustable across the same and having a longitudinal center line, said band bearing time marking, a declinator band disposed within the frame and disposed transversely of the hour band, means for pivotally mounting the declinator band including a ring, a pair of spaced supporting rods extending across the ring, a gnomon rod extending across the ring and located between the supporting rods, a pointer articulatively connected to the hour band, a chart indicating dates and months over which the pointer is moved upon shifting movements of the hour band, the declinator band being calibrated on its upper face with dates and degrees, a wire connecting the rods and located above the center line of the hour band, a pointer suspended from the wire and directed downwardly, a pair of co-operating movable disk charts located at one end of the frame, one of the charts being calibrated to indicate longitudes and time zones, the second chart being calibrated to indicate clock time, the charts being adjustable relatively to one another, one of the charts being mounted for manual rotative adjustment and the other being secured to the supporting rods and being rotated when the supporting rods are rotated, and a globe slidable on the supporting rods and rotatable therewith.

7. A solar instrument comprising, a frame, a calibrated hour band adjustable across the frame, a pivotal declinator band mounted over the hour band, a globe mounted over the declinator band and slidable relatively thereto, an indicator for designating points on the globe, a lamp directed toward the globe, a chart having relatively movable sections, one of which is so connected to the globe as to be rotative in company with the globe, the other of said sections being rotatively adjustable relative thereto, one of said sections being calibrated to indicate longitudes and time zones and the other section being calibrated to indicate clock time, and a fixed pointer for the chart.

8. A solar instrument comprising, a base, an arcuately-shaped frame mounted on the base and adjustable arcuately relatively to the same, an hour band calibrated in time periods mounted centrally of the frame and adjustable transversely across the frame, a ring supported in the frame, an arcuately-shaped declinator band disposed within the ring, the face of the declinator band carrying a scale calibrated to indicate latitudes and degrees, an indicating pointer coupled to the hour band, a chart bearing dates over which the pointer is moved, means by which the pointer can be adjusted relatively to the hour band, a pair of rods extending between the ends of the declinator band, a globe slidable on the rods, a gnomon rod located between said rods and constituting the axis for the globe, the declinator band and the rods and globe thereon being unitarily rotative, a chart bearing longitudes and time zones rotative along with the globe, and an underlying chart independently rotative and bearing clock time.

References Cited in the file of this patent
UNITED STATES PATENTS

| | | |
|---|---|---|
| 908,110 | Lihon | Dec. 22, 1908 |
| 1,044,238 | Pilkington | Nov. 12, 1912 |
| 1,148,891 | Coultrap | Aug. 3, 1915 |
| 1,584,194 | Sautter | May 11, 1926 |
| 2,192,750 | Mead | Mar. 5, 1940 |
| 2,754,593 | Sundblad | July 17, 1956 |

FOREIGN PATENTS

| | | |
|---|---|---|
| 296,669 | Italy | May 21, 1932 |